United States Patent [19]
Nagano

[11] 4,296,534
[45] Oct. 27, 1981

[54] CLAMP FOR FLEXIBLE HOSES

[75] Inventor: Kenji Nagano, Minoo, Japan

[73] Assignees: Osakasanko Kabushiki Kaisha; Kabushiki Kaisha Taiyohatsujyo Seisakusho, both of Osaka, Japan

[21] Appl. No.: 120,790

[22] Filed: Feb. 12, 1980

[30] Foreign Application Priority Data

Nov. 1, 1979 [JP] Japan .................... 54-151895[U]

[51] Int. Cl.³ ............... B65D 63/00; B65D 45/34; F16L 33/00
[52] U.S. Cl. .................................. 24/270; 24/27; 24/28; 24/68 C; 285/252; 292/256.69
[58] Field of Search ............... 24/270, 27, 28, 29, 24/68 C, 69 R; 285/252, 243; 292/256.69

[56] References Cited

U.S. PATENT DOCUMENTS

| | | |
|---|---|---|
| 996,478 | 6/1911 | Francis .................. 24/27 |
| 1,483,050 | 2/1924 | Wells .................... 24/270 |
| 1,598,561 | 8/1926 | Coomer .................. 24/270 |
| 1,912,114 | 5/1933 | Allen .................... 24/270 |
| 2,194,317 | 3/1940 | O'Neill .................. 24/270 |
| 2,303,625 | 12/1942 | Ellis .................. 292/256.69 |
| 2,750,064 | 6/1956 | Clarke ................ 292/256.69 |
| 2,817,130 | 12/1957 | Roberts et al. ........... 24/27 |
| 3,141,642 | 7/1964 | Mayrath .................. 24/270 |
| 3,151,895 | 10/1964 | Ward .................... 24/270 |
| 3,213,499 | 10/1965 | Bylstra .................. 24/27 |

FOREIGN PATENT DOCUMENTS 549898 12/1942 United Kingdom .................. 24/270

Primary Examiner—Victor N. Sakran
Attorney, Agent, or Firm—Armstrong, Nikaido, Marmelstein & Kubovcik

[57] ABSTRACT

A clamp used mainly for connectively fixing a flexible hose, typified by a gas hose, water-service hose or the like, to the mouthpiece portion of a cock, joint or the like. The clamp comprises a clamping band formed of a single metal wire wound into a pair of circular rings adapted to loosely receive a hose therein, an operating lever formed of a metal strip disposed immediately above the overlap portion of the circular rings and pivotally engaged at its one end by one end of the winding of the clamping band, and a prop arm which connects the intermediate portion of the operating lever to the other end of the winding of the clamping band, the arrangement being such that by urging the operating lever at the other end thereof toward the circular rings of the clamping band, the lever action forces the opposite ends of the winding of the clamping band to move away from each other, thereby contractively deforming the opening diameter of the circular rings to effect the clamping of the hose.

3 Claims, 6 Drawing Figures

CLAMP FOR FLEXIBLE HOSES

BACKGROUND OF THE INVENTION

The present invention relates to a clamp used mainly for connectively fixing a flexible hose of rubber or synthetic resin, typified by a gas hose, water-service hose or the like, to the mouthpiece portion of a device, such as a cock, valve, joint or the like.

For example, when it is desired to connect a gas hose of rubber to the mouthpiece portion of a cock or joint, it is necessary to achieve a secure fixing of the hose in order to prevent the leakage of gas. When conventional clamps of the character described are classified by mechanism, the following two types may be said to be in wide use.

One of the types comprises a single metal wire wound into a pair of circular rings, and knobs of plastic material fixed to the opposite ends of the winding, the spring force of said circular rings being utilized to clamp the hose. The other type comprises a metal strip having a number of meshing apertures punched out therein, said metal strip being wound into a circular ring which functions as a worm wheel, and an operating threaded rod mounted on the circular ring and serving as a worm meshing with said meshing apertures, or comprises a metal strip wound into a circular ring, a portion of which is extended and has a nut fixed thereto, and an operating threaded rod screwed into said nut tangentially of said circular ring; in either case, the arrangement is such that the rotation of the threaded rod causes the opening diameter of the circular ring to be contractively deformed for clamping the hose.

In the former type, however, since the circular ring of wire is always in a state where its opening diameter is contracted, making it necessary to forcibly expand said opening diameter by grasping the operating knobs toward each other in using the clamp, the clamping force tends to be prematurely fatigued. Further, since the clamping force relies only on the so-called free springiness of the wire material rather than being restrained, the clamping force naturally weakens, involving much danger of the clamp idly turning or moving relative to the hose. In this connection, in order to increase the clamping force, it would be contemplated to greatly contract the opening diameter of the circular ring in advance. Such arrangement, however, would require an excessive operating force for grasping the knobs toward each other to forcibly expansively deform the opening diameter in attaching the clamp to the hose, thus detracting from the operability of the clamp.

On the other hand, with the latter mechanism, by rotating the operating threaded rod, the opening diameter of the circular ring can be smoothly expansively deformed, and since such expansive state is maintained by the threaded rod, there is no problem in the operability. On the contrary, however, because of the contractive deforming action of the circular ring brought about by the rotation of the threaded rod, coupled with the fact that a metal strip is used to form the circular ring, the clamping force lacks springiness. Moreover, hoses are made of rubber or other soft material and the final position for clamping is uncertain, so that the magnitude of the clamping force will vary with the operator's "feel", with the result that the hose can be damaged by an excessive clamping force or can idly turn or move if the clamping force is too low. Further, the need of punching out a number of meshing apertures in the metal strip required for meshing with the operating threaded rod and assembling the nut in advance makes the construction complicated and is disadvantageous to mass-production.

SUMMARY OF THE INVENTION

The present invention has been accomplished to solve the problems in said two types. Accordingly, objects of the invention are to provide: first, a clamp for flexible hoses, comprising a clamping band formed of a single metal wire wound into circular rings to provide a springy clamping force, and an operating lever of the so-called single manipulation type, the arrangement being such that by simply pressing said operating lever, the lever action causes the opening diameter of the circular rings to be contractively deformed instantaneously in a toggle mechanism manner to establish a firm clamped state of the hose; secondly, a clamp for flexible hoses, wherein in the clamp-completed state of the hose, the operating lever, which provides a lever action, passes the dead point of link motion and is thereby urged against the circular rings, thereby assuring a perfect fixed or locked state which will not be accidentally disturbed, and a uniform clamping force which will not vary with the operator's manipulation; and thirdly, a clamp for flexible hoses which is composed of few parts requiring little material, said parts being formed by winding a single wire to provide rings and stamping a metal sheet to provide an operating lever. Other objects of the invention will become apparent from the following description.

DESCRIPTION OF THE PREFERRED EMBODIMENT

Figure 1:
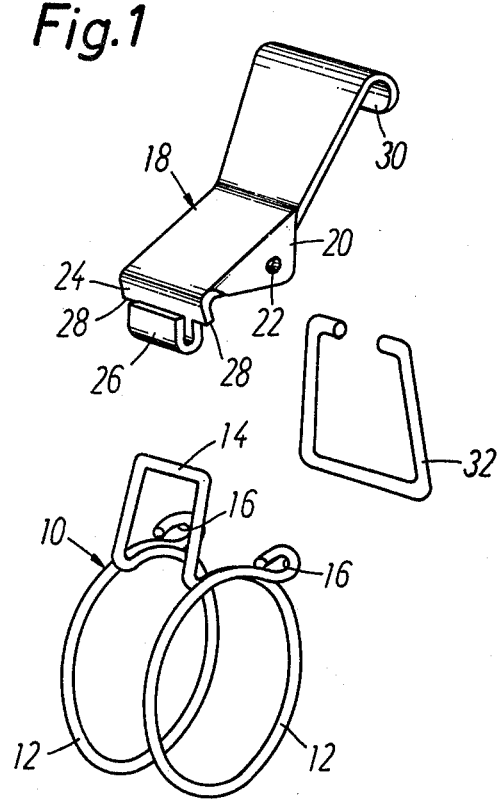
FIG. 1 is an exploded perspective view of a clamp according to the present invention.
Figure 2:
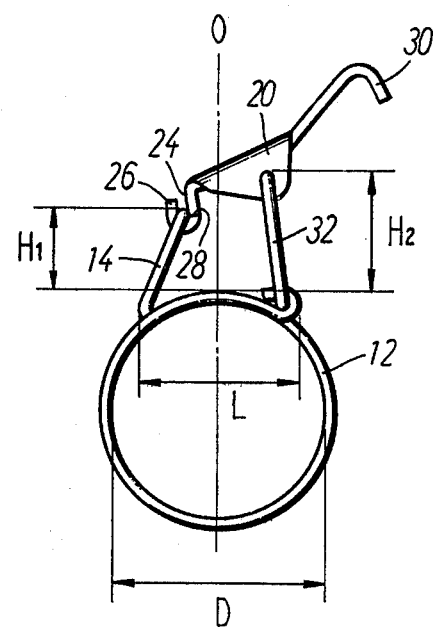
FIG. 2 is a side view of the clamp in its assembled state.

The drawings illustrate a clamp according to the present invention, used for the connective fixing of a rubber hose In FIGS. 1 and 2, a clamping band 10 formed by winding a single stainless steel wire, piano wire or other springy metal wire comprises a pair of circular rings 12 having a fixed opening diameter allowing the passage of a hose therethrough, an inverted U-shaped rising bracket arm 14 upwardly bent to a height $H_1$ continuously outwardly from said circular rings 12 to span the latter, and a pair of eyelets 16 formed by upwardly turning back the rear end of the winding for said circular rings 12.

Figure 3:
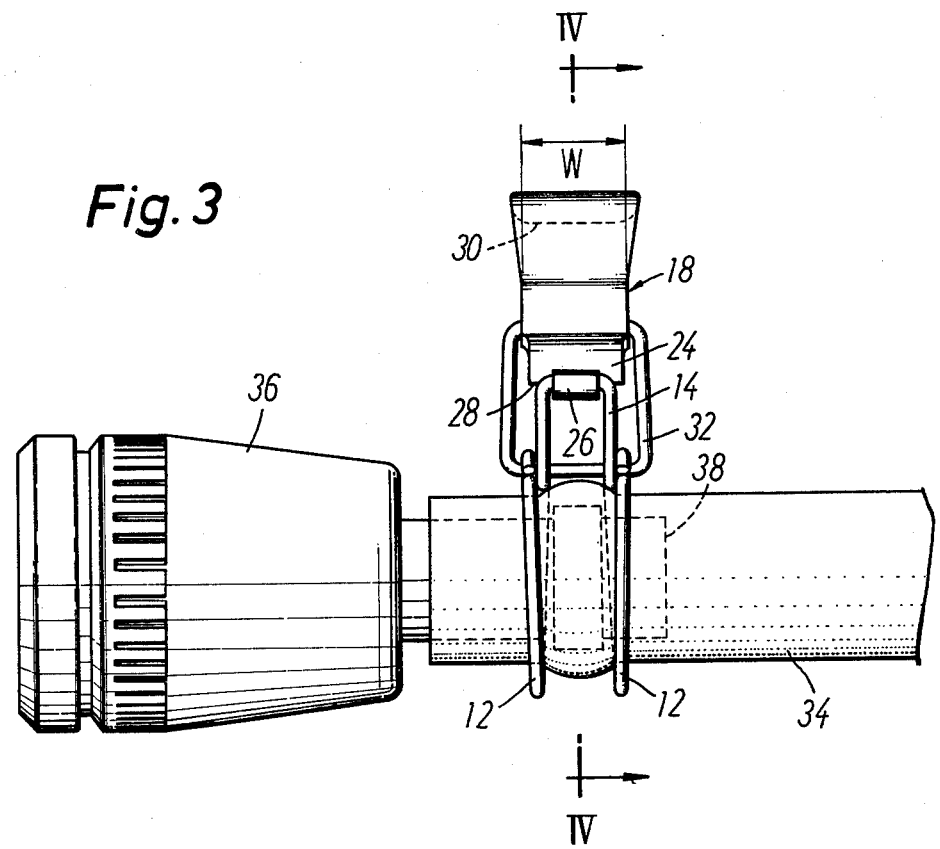
FIG. 3 is a front view of the clamp mounted on a hose to be ready for clamping the hose.

More particularly, the intermediate portion of a single straight metal wire is bent into halves which are then each wound in γ-shape to form said pair of opposed concentric circular rings 12, with said eyelets 16 formed at the opposite ends of the wire. The circular rings 12 overlap each other a fixed length L in their upper portions, while said rising bracket arm 14 and said eyelets 16 are disposed respectively on the opposite sides of the vertical center line O of the circular rings 12 which substantially bisects the overlap length L, as shown in FIG. 2. As can be seen in FIG. 3, the continuous winding of the wire is such that the rising bracket arm 14 is disposed inside the circular rings 12 while the eyelets 16 are disposed outside the circular rings 12. However, it is, of course, also possible to wind the wire in such a manner as to reverse such relative position of the arm and eyelets.

An operating lever 18 of fixed length is formed by stamping a stainless steel or other metal strip, the width w of the intermediate portion thereof being substantially equal to the distance between the circular rings 12 of said clamping band 10, and it is disposed immediately above the overlap portion of the circular rings 12. The numeral 20 designates a pair of legs bent downwardly from the intermediate portion of the lever 18 at a right angle, the lower edges being preferably smooth arcuate surfaces as viewed in a side view. The numeral 22 designates a pair of opposed, prop arm receiving holes formed approximately in the middle portions of said legs 20, and the numeral 24 designates a presser downwardly extending from and at right angles with the front end of the operating lever 18 and formed at its front end with a narrow hook 26 arcuately bent continuously therefrom substantially into U-shape as viewed in a side view. A pair of notched steps 28 are left in the boundary between the presser 24 and the hook 26. The hook 26 is pivotally supported on the rising bracket arm 14 of the clamping band 10 to allow the pivotal movement of the operating lever 18. Thus, the hook 26 is smaller in width than the presser 24 to be capable of receiving the horizontal bar portion of the inverted U-shaped rising bracket arm 14, so that when the operating lever 18 is manipulated, the horizontal bar portion of the rising bracket arm 14 is forwardly urged by the wide presser 24, as will be later described, thereby preventing the breakage of the narrow hook 26. The numeral 30 designates a smooth-surfaced finger rest downwardly extending from the rear end of the operating lever 18 and bent into L-shape, and having a width somewhat larger than the width W of the intermediate portion of the lever so as to cover the rear end of the clamping band 10 having the opposed eyelets 16 from the top and rear. The surface of the operating lever 18 formed of a metal strip is marked with indications including the clamp class corresponding to the associated hose and the manufacturer's name. While the finger rest has been shown as having a naked metal surface, it may preferably be fitted with a sack of plastic material or the like to facilitate the manipulation thereof. The arrangement of the finger rest 30 is not limited to simply covering the rear end of the clamping band 10, with a clearance left therebetween. As can be suggested in FIGS. 5 and 6, the finger rest 30 may be sharply bent at an acute angle so that when the operating lever 18 is depressed, as will be later described, the finger rest 30 is intentionally strongly urged against the rear end of the clamping band 10 where said eyelets 16 are formed, thereby improving safety as well as said covering function.

The numeral 32 designates a prop arm formed of a single metal wire bent substantially into U-shape, the lower end portion thereof being loosely horizontally inserted in the eyelets 16 of the clamping band 10, the cut ends of said prop arm being inwardly bent toward each other and inserted in the holes 22 of the legs 20. The prop arm 32, when seen laterally as in FIG. 2, rises outwardly of the circular rings 12 of the clamping band as in the case of said rising bracket arm 14, but its height $H_2$ is somewhat greater than the height $H_1$ of the arm 14 and the prop arm 32 is forwardly tilted toward the arm 14, whereby, as will be later described, when the operating lever 18 is depressed, a proping action is exerted without fail such that the lower end portion of the prop arm 32 rearwardly urges the rear end of the winding of the clamping band while the front end portion of the lever 18 forwardly urges the front end of the clamping band 10, thereby contractively deforming the diameter D of the circular rings 12 for clamping the hose.

In brief, the front end of the γ-shaped winding of the clamping band 10, which forms said rising bracket arm 14, is engaged at a pivot point A with the hook 26 disposed at the front end of the operating lever 18 to allow the turning motion of the latter, while the rear end of the winding of the clamping band 10 forming the eyelets 16 is engaged at a pivot point B with the lower end portion of the prop arm 32, and the upper end of said prop arm 32 is pivotally engaged at a pivot point C with the legs 20 disposed on the intermediate portion of the lever 18. As a result, a link mechanism is constituted which allows the lever action of the operating lever. The finger rest 30 formed on the rear end of the operating lever 18 rearwardly extends beyond the lower pivot point B for the prop arm 32.

The manner of using the clamp of the invention for connectively fixing a rubber hose 34 will now be described.

Figure 4:
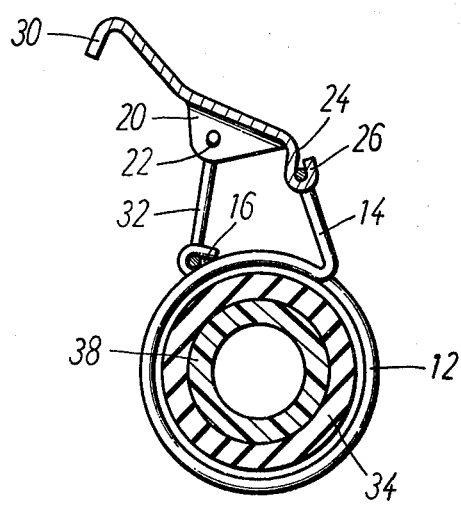
FIG. 4 is a sectional view taken along the line IV—IV of FIG. 3.

First, as shown in FIGS. 3 and 4, the clamp with the diameter D of the circular rings 12 enlarged is loosely fitted on the hose 34, the latter is then fitted on the mouthpiece portion 38 of a cock or joint 36, whereupon the clamp is positioned on the connected area. In this case, since the clamping band 10 is wound into circular rings having an enlarged diameter capable of receiving the hose 34 therein, the operation of loosely fitting the clamp on the hose 34 and then positioning it on the latter can be smoothly performed.

Figure 5:
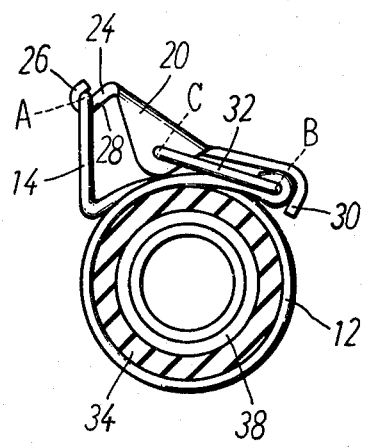
FIG. 5 is a side view of the clamp, completing the clamping of the hose.

After said positioning, the operator applies his finger to the finger rest 30 of the operating lever 18 to depress the latter so as to urge the lever 18 from the FIG. 4 state to the FIG. 5 state against the circular rings 12 of the clamping band 10. In so doing, the lever 18 turns the prop arm 32 until it lies flat by the lever action as the lever turns around said pivot point A, whereby the rear end of the winding of the clamping band 10 is rearwardly urged by the lower end of the arm 32 while the front end of the winding of the clamping band 10 is forwardly urged by the presser 24 disposed on the front end of the lever 18. Such simultaneous urging movements in opposite directions contractively deform the diameter D of the circular rings 12 of the clamping band 10 against their spring force, so that the hose 34 is instantaneously clamped and fixed in position.

Figure 6:
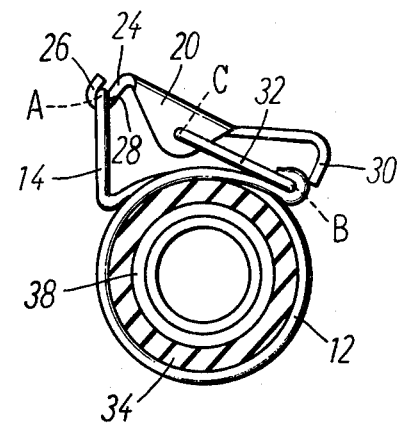
FIG. 6 is a side view, illustrating the clamping process.

In such clamping movement, as shown in FIG. 6, the lever 18 has a dead point at which the pivot point C for the lever 18 and prop arm 32 is in line with the pivot point A for the lever 18 and band 10 and the pivot point B for the band 10 and prop arm 32, and since the lever 18 is further depressed beyond said dead point, in the FIG. 5 state where the prop arm 32 is finally brought into close contact with the circular rings 12, it follows that the hose 34 is securely locked under a fixed clamping force. In this clamp-completed state, the eyelets 16 of the clamping band 10 are covered with the wide finger rest 30 of the lever 18 from the rear and top, so that there is no danger of the fingers being hurt by the cut ends of the metal wire, nor is a danger of the lever 18 being accidentally pulled up by the bend of the finger rest 30. Particularly, accidental spring-up of the lever 18 can be perfectly prevented by giving a sharp angle to the bend of the finger rest 30 so that in the course of the depressing operation shown in FIG. 6, the lower end of the finger rest 30 is once intentionally brought into abutment against the rear end of the clamping band 10 forming the eyelets 16 and the finger rest 30 is then forcibly depressed, as shown in FIG. 5, into pressure contact with the rear end of the clamping band 10. Thus, safety means can be achieved by simply determining the angle of bend of the finger rest 30, without requiring any special, additional processing. Coupled with the operation of depressing the lever 18 beyond its dead point, this provides satisfactory maintenance of the locked state of the hose 34.

Reversely, when it is desired to unlock the hose 34 for exchange or other purposes, this may be achieved by pulling up the finger rest 30 of the operating lever 18 from the FIG. 5 locked state. At this time, since the restoring force of the clamping band 10 acts, the diameter D of the circular rings 12 is quickly enlarged in the manner of quick motion, so that the hose 34 can be instantly pulled out from the mouthpiece portion 38 of the joint 36 or the like.

As described above, with the clamp of the present invention, the circular rings 12 of the clamping band 10 can be forcibly contractively deformed by the lever action of the operating lever 18 and by the toggle mechanism and in a single light manipulation. This fact, coupled with the band 10 itself being formed of a single metal wire, makes it possible to firmly fix the hose 34 as if by a strangle hold. It is to be understood that any clamps which employ such motion mechanism are within the scope of the invention.

While a gas hose and water-service hose have been mentioned as examples of the flexible hose, the invention is, of course, not limited thereto. Such flexible hoses include, for example, fluid feed hoses and the like for so-called industrial use which are installed in various machines and vehicles, and it goes without saying that the clamp of the invention can be used for clamping hoses and tubes for such use.

What is claimed is:

1. A clamp for flexible hoses consisting of:
   a clamping band formed by continuously winding a single springy metal wire to provide a pair of concentric circular rings partly overlapping each other to receive a hose and facing each other with a predetermined spacing therebetween, an inverted U-shaped rising bracket arm spanning the space between said circular rings at one of the respective ends of said rings, and a pair of eyelets formed by bending back the other ends thereof;
   an operating lever of metal strip integrally formed with a hook at one end thereof, a pair of eyelets having insertion holes in a middle portion thereof, and a substantially inverted L-shaped finger rest at the other end thereof, said operating lever being mounted immediately above the overlap region of said circular rings with said hook being pivotally engageable with said bracket arm; and
   a substantially U-shaped prop arm of metal wire pivotally supported at the upper end thereof in said insertion holes of said operating lever and at the lower end thereof in said eyelets of said circular rings, said prop arm being normally held in its rising position, the arrangement being such that by pressing said lever at said finger rest on its free end side downwardly against said circular rings of the clamping band, the opposite ends of the winding of the clamping band are forced to move away from each other under the resulting lever action, thereby contracting the diameter of the circular rings to clamp the hose.

2. A clamp for flexible hoses as set forth in claim 1, wherein the other end of the operating lever is bent to form a finger rest which is capable of covering the other end of the winding of the clamping band.

3. A clamp for flexible hoses as set forth in claim 1, wherein the other end of the operating lever is bent for use as a finger rest, such that it will be manually forcibly brought into pressure contact with the other end of the winding of the clamping band.

* * * * *